G. MEES.
FLYING MACHINE.
APPLICATION FILED AUG. 8, 1910.
1,096,045.
Patented May 12, 1914.
5 SHEETS—SHEET 1.
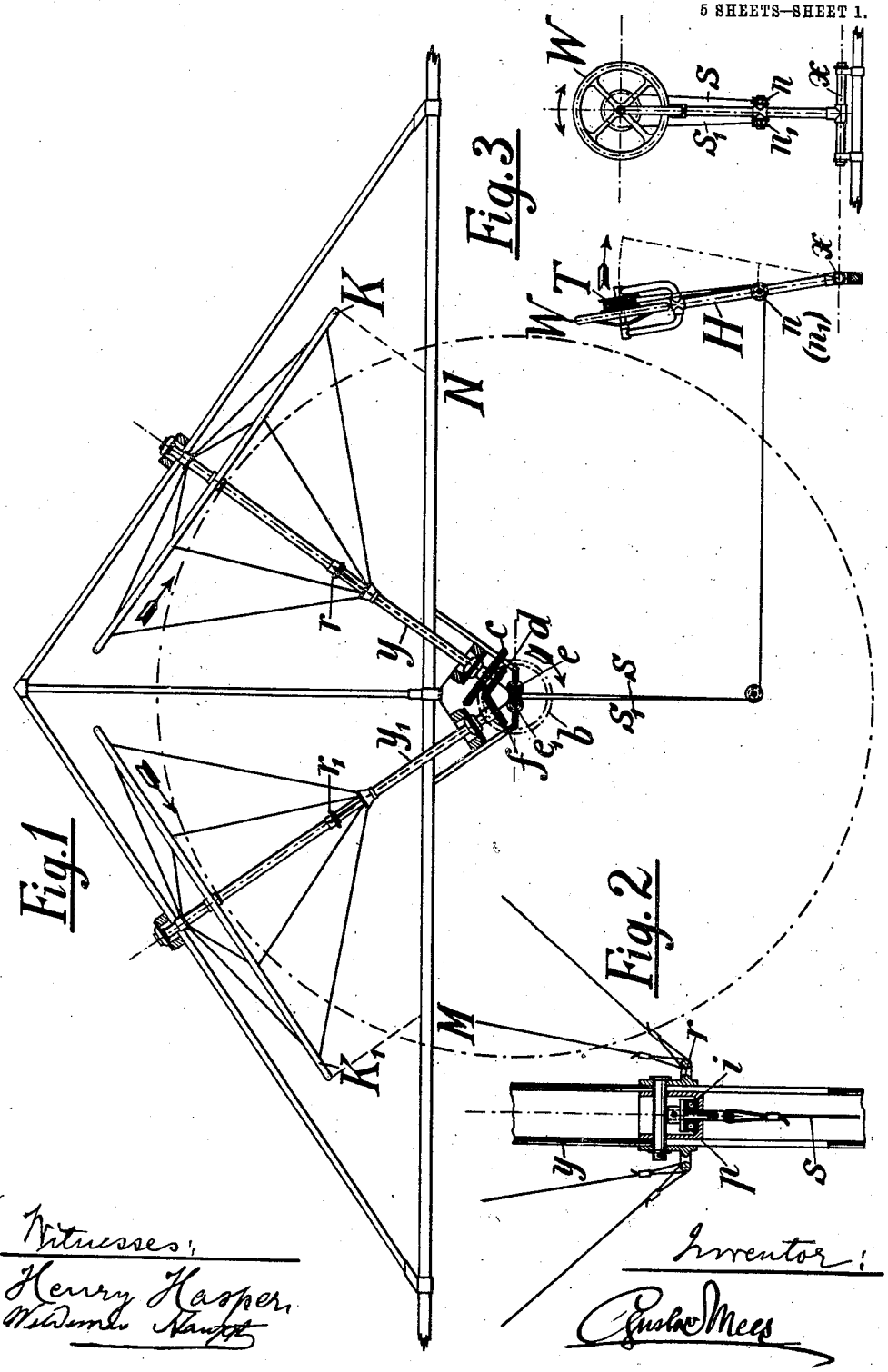

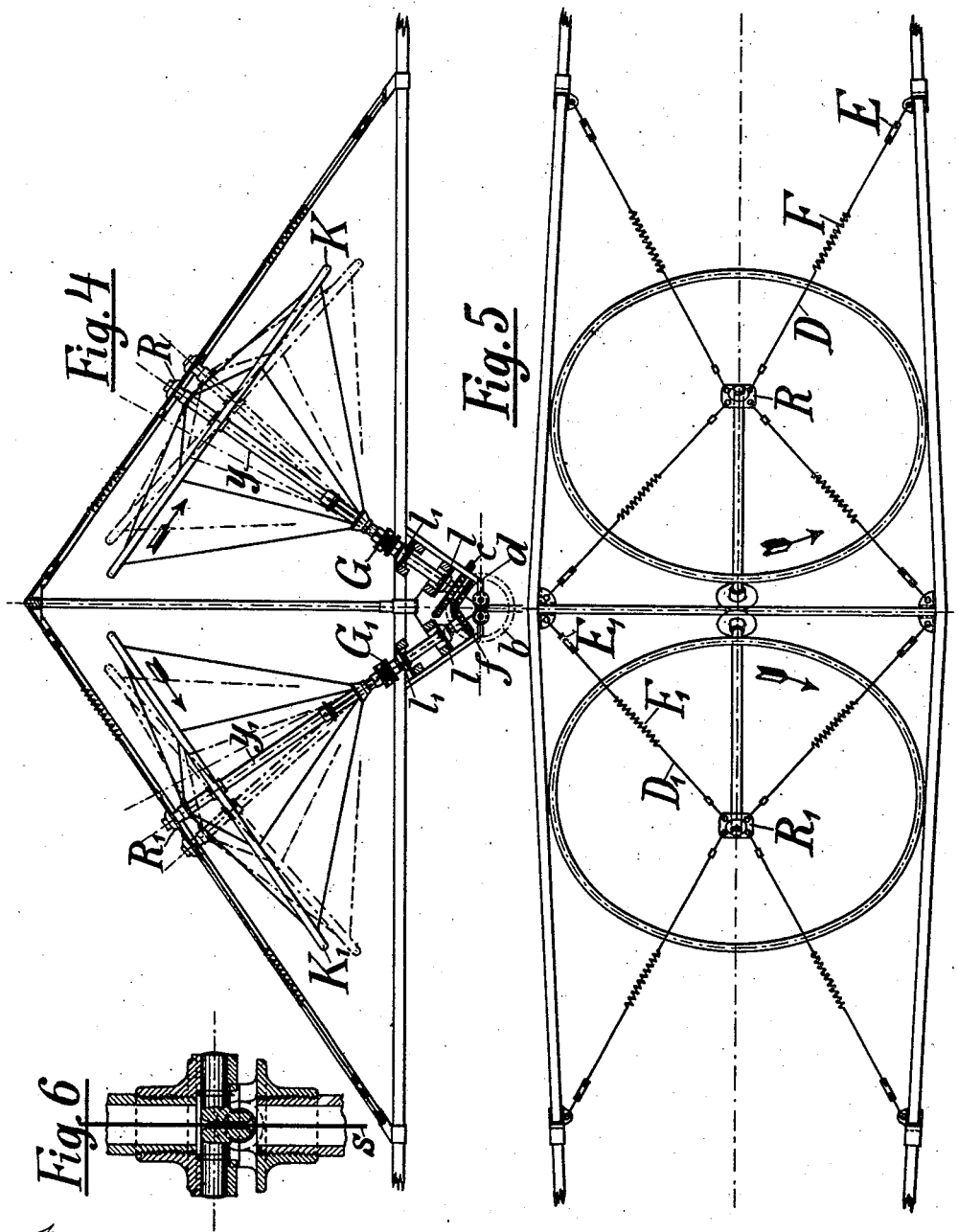

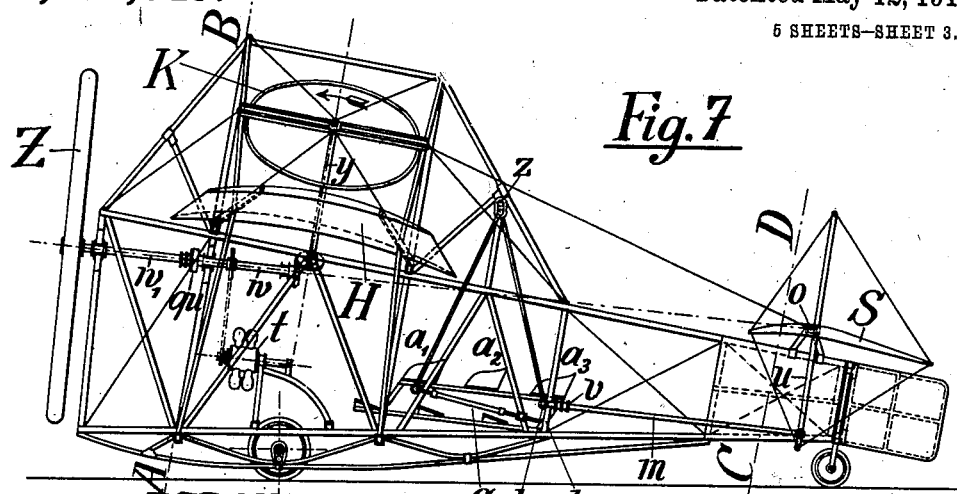
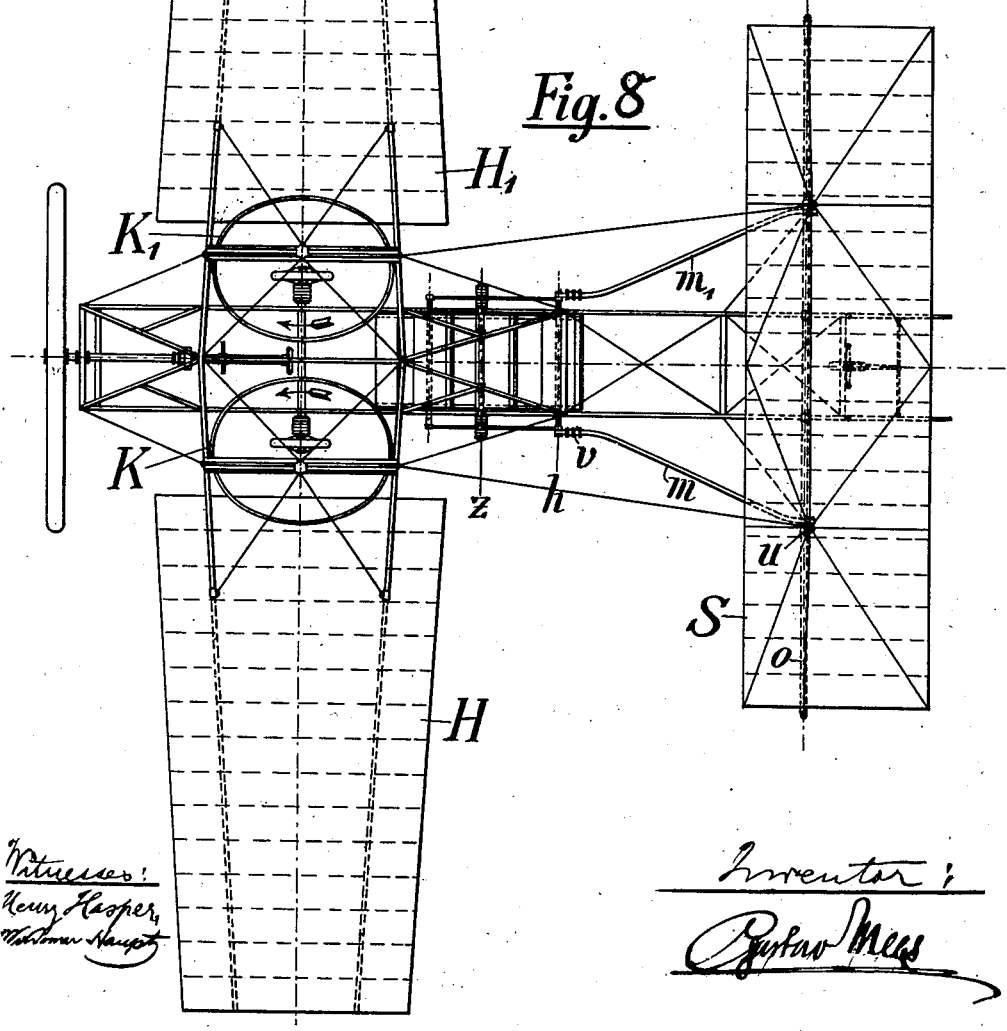

G. MEES.
FLYING MACHINE.
APPLICATION FILED AUG. 8, 1910.
1,096,045.
Patented May 12, 1914.
5 SHEETS—SHEET 4.
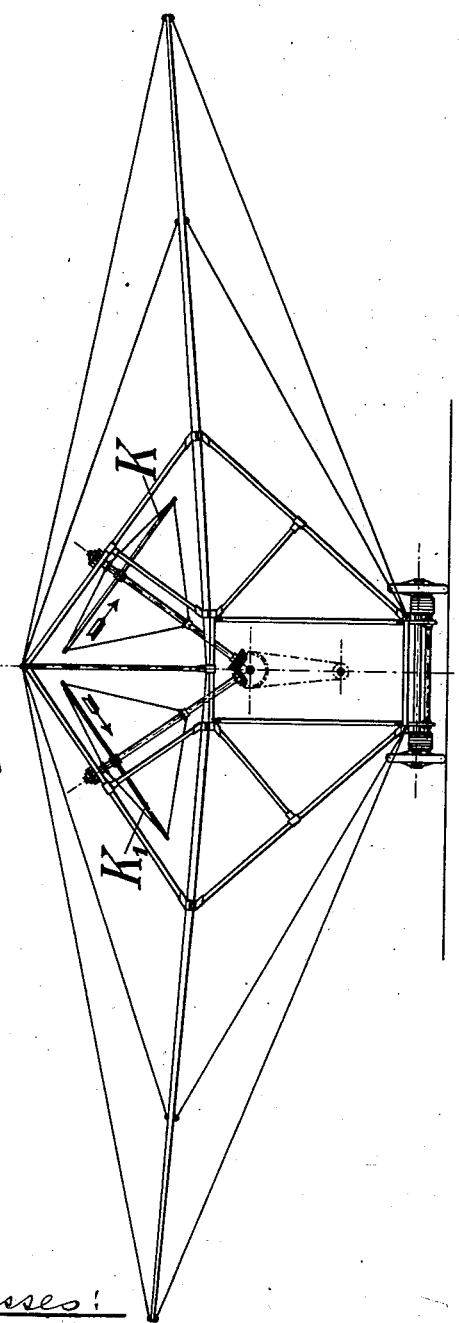
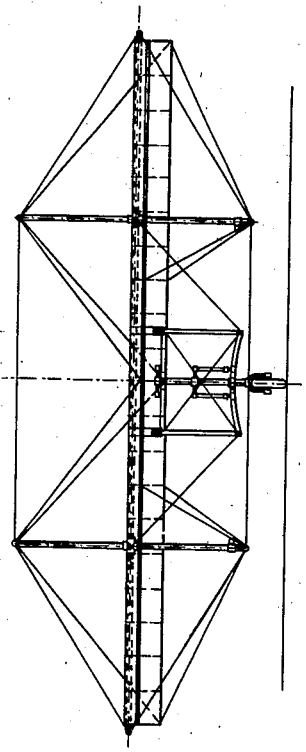

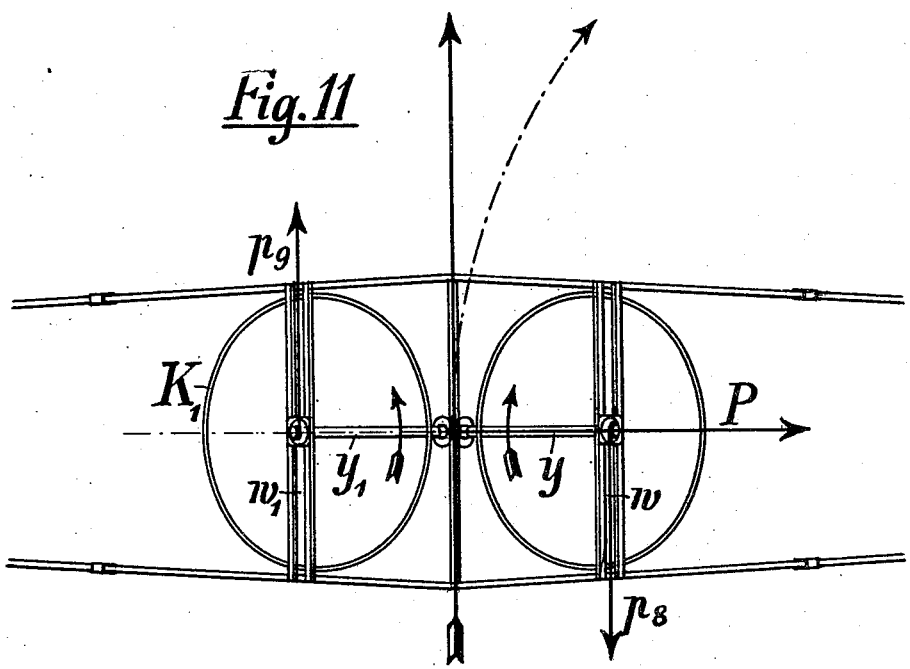
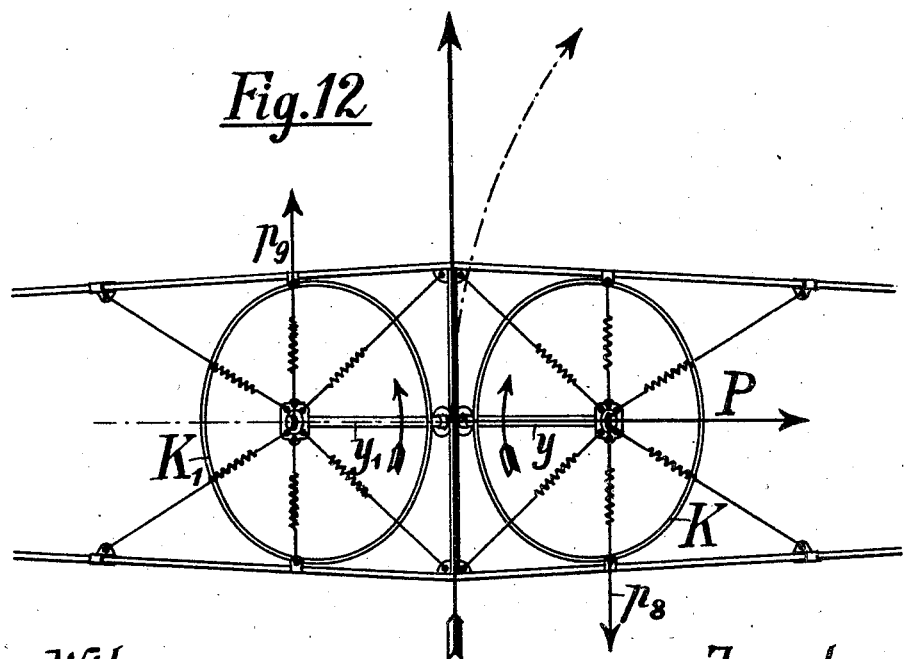

UNITED STATES PATENT OFFICE.

GUSTAV MEES, OF CHARLOTTENBURG, GERMANY.

FLYING-MACHINE.

1,096,045.  Specification of Letters Patent.  Patented May 12, 1914.

Application filed August 8, 1910. Serial No. 576,188.

*To all whom it may concern:*

Be it known that I, GUSTAV MEES, a subject of the German Emperor, and residing at Charlottenburg, near Berlin, Germany, have invented certain new and useful Improvements in Flying-Machines, of which the following is a specification.

The subject-matter of my invention is a flying machine, in which use is made of the steering lifting-propeller which is combined with a flywheel acting as a gyratory body and forms the subject-matter of my co-pending application Serial No. 536,686 filed January 8, 1910, a double, so-called steering and steadying propeller being provided.

Some illustrative embodiments of my invention are represented by way of example in the accompanying drawings, wherein:—

Figure 1 is a diagram showing the general arrangement of the two steering and steadying propellers, Fig. 2 shows a detail of the steering mechanism in section, and Fig. 3 shows the control mechanism of the steering propellers in elevation; Figs. 4 to 6 are elevation, plan and sectional elevation, respectively, showing an improved arrangement of the steering and steadying propellers according to Fig. 1; Figs. 7 and 8 are side elevation and top plan view, respectively, showing the general arrangement of the flying machine, while Figs. 9 and 10 are sections in the planes A—B and C—D, respectively, in Fig. 7. Figs. 11 and 12 are diagrammatical views of the steering and steadying propellers showing the influence of the gyroscopical action on steering.

As is well-known, a gyratory body has the property, when its axis is turned by any disturbing force from its position for the time being, of tending to move at right angles to this deviating force. Consequently, when employing only one steering and steadying propeller, such as is described in my co-pending application mentioned above, a swinging movement of the flying machine rigidly connected with the steering and steadying propeller caused by a strong gust of wind or in other manner in the longitudinal direction would cause a corresponding swinging movement in the transverse direction, and reversely. If it is desired to avoid this secondary movement, according to the example of Professor Skutsch's double ship's gyratory body the only mode of doing this is to arrange two gyratory bodies of equal mass and equal velocity of rotation but of opposite direction of rotation when the oppositely-directed deviating forces of the gyratory bodies will reciprocally negative one another. Further, in this double arrangement of the steering and steadying propeller the reaction torques due to the driving mechanism of the propellers mutually negative one another in well-known manner. This double arrangement may be brought about in various ways. One possibility is to mount the steering and steadying propellers one below the other when the advantage is obtained that the spread of the planes of the machine must be increased, as compared with that in an ordinary aeroplane, only by the diameter of the steering and steadying propeller, whereas when arranged beside each other with parallel axes, twice this space is lost for the lifting planes of the aeroplane, and the span must be correspondingly increased in order to obtain an equal area of lifting surface. Further, in this latter arrangement the driving mechanism becomes very complicated. When arranged one under the other, however, a tilting moment is produced owing to the two steering and steadying propellers not operating in the same plane.

In order to avoid the above mentioned disadvantages of the two arrangements I arrange the two steering and steadying propellers K, $K_1$, as shown in Fig. 1, with their axes $y$, $y_1$ inclined toward each other in such manner that the latter inclose a suitable angle of, for example, 60° to 90°. In this manner twice the diameter of the steering and steadying propeller is not lost for the arrangement of carrying planes, but only the considerably smaller space from M to N. The two steering and steadying propellers are driven from an approximately horizontal shaft $w$ (Fig. 7), on whose front end the main screw propeller Z for driving the flying machine forward is keyed, this propeller being indicated in dotted lines in Fig. 1. The driving power is first transmitted by means of the pair of bevel gears $b$, $c$ to the axle $y$ and this then drives the other axle $y_1$ by means of the pair of gears $d$, $f$. In addition to the above mentioned advantages this arrangement has the further very material advantage that, in consequence of the relatively slanting positions of the two steering and steadying propellers, the air between the same is compressed, as it were, and as the same are located, in addition, in the current of air driven to the rear by the main driving propeller, an action which is very considerably increased as compared with ordinary lifting propellers results, so that considerable lifting force can be obtained with relatively small propellers. An additional, very important advantage of the shafts being arranged slanting toward one another consists in the lifting propellers in this arrangement being able to be employed not only as an elevation rudder but also as a horizontal rudder. Namely, if only one of the two steering propellers is adjusted for steering by turning the blades on their axles in the manner described in my co-pending application, or if the one screw propeller is given a greater pitch than the other, the flying machine becomes deviated laterally from its rectilinear path of flight by the lateral components of the lifting force of the propeller in question. If, on the contrary, both the steering propellers are adjusted simultaneously and to the same pitch, the laterally-directed components of the lifting forces of the screw propellers mutually negative one another, whereas the vertical components are added together in such manner that the flying machine rises under the action of these vertical forces. Consequently, when the one steering propeller is set to a great pitch and the other to zero, very sharp curves can be described.

It is essential that when taking a sharp curve the machine automatically adopts a laterally slanting position. For this purpose the steering propellers are driven so that the blades on the inside i. e. nearest the median vertical plane of the machine, move in the direction of travel, as indicated by the arrows in Figs. 8 and 11. Consequently, on this side the actual velocity of the propeller blades in space is the sum of their velocity about the propeller axes and the velocity of the machine, whereas in the case of the propeller blades on the other side the velocity of the machine is deducted from the velocity of rotation. The blades on the inside therefore exert a much larger lifting force than those on the outside, and if the two propellers are adjusted at different pitches this action tends to rotate the machine about its longitudinal axis (i. e. to tilt it laterally) against the resistance opposed to such tilting movement by the gyroscopic action of the propellers. The low position of the center of gravity of the machine causes this tilting effort to be assisted by centrifugal action, manifesting itself in an outward swing of said center.

The automatic tilting of the machine when describing a sharp curve has an important secondary effect of great advantage. This will easily be understood in explaining the Figs. 11 and 12, wherein K and $K_1$ are the two propeller rims rotating in opposite directions, the upper ends of the propeller shafts $y$ and $y_1$ being rigidly connected to the frame by cross bars $w$ $w_1$, as shown in Fig. 11, or flexibly by interposition of springs or india rubber stretchers, as shown in Fig. 12. A well known characteristic of the gyroscope is its tendency to deflection at right angles to the direction of a force disturbing its axial position, the direction of said deflection depending on the direction of rotation and the direction in which the axis is deflected by the primary disturbing force. If the blades of my stabilization propellers are adjusted so that the machine dips on one side, say the right hand side, the propeller K, as viewed in Fig. 11, tends to swing rearward and the propeller $K_1$ to swing forward, that is to say, the machine as a whole is acted on by the couple indicated by the arrows $p_8$ $p_9$, tending to rotate it about its vertical axis so as to cause a deflection of path toward the right of the long straight arrow. This deflection is toward the same side as the deflection due to the lateral thrust-component P of the separately working or preponderating stabilization propeller, that is to say, the gyroscopic deflecting effort is added to the steering effect of the propeller, and assists in causing the machine to describe some such curve as is indicated by the dotted arrow.

When the preponderating propeller is restored to equality with its fellow, the low center of gravity acts to restore the machine to normal horizontal position in proportion as the centrifugal tilting force is spent. The couple acting on the machine through the propeller axes is in this case of course reversed, and causes the machine to be turned from the curve just described to a rectilinear path of flight.

It may be noticed that the described action of the propellers is essentially the same whether the connection of the upper ends of the propeller shafts $y$ and $y_1$ to the frame of the machine be rigid as shown in Fig. 11, or flexible as shown in Fig. 12.

The steering propellers are adjusted to greater or less pitch by ropes $s$, $s_1$, one rope for each propeller, which extend into the hollow shafts of the propellers and are attached to small ball bearings $i$ provided on sleeves $p$ which are arranged slidably in the hollow shafts of the steering and steadying propellers (see Fig. 2). These sleeves are connected by bolts with sliding sleeves $r$, $r$, located outside on the steering propeller shafts, to which sleeves the wires are attached which lead to the propeller blades arranged revolubly on their axles, as described in my co-pending application Serial No. 536,686. Thus, when the ropes $s$, $s$, in the hollow axles are pulled, the sleeves $r$, $r_1$ on the axles are pulled downwardly and the pitch of the screws is made greater.

In Fig. 3 the device for operating the two steering propellers is represented. It comprises a steering lever H, to the forked end of which a large hand-wheel W provided with a rope-drum is arranged on an axle in a well-known manner. The steering rope is wound several times around this drum, and its ends $s$, $s_1$ attached to the above mentioned sleeves $r$, $r_1$ are guided over two rollers $n$, $n_1$ arranged at a certain distance from the pivot $x$ of the lever H. If this lever is thrown over in the direction of the arrow, without the hand-wheel and rope-drum being simultaneously rotated, as the two guide rollers $n$, $n_1$ mounted on the lever are moved to the right the two ropes $s$, $s_1$ are pulled equally, so that the two sleeves $r$, $r_1$ on the shafts $y$, $y_1$ are pulled an equal distance downward and consequently the lifting propellers are adjusted to the same pitch. In this event, owing to the load on the main carrying planes being reduced by the lifting pull of said propellers the flying machine becomes directed upwardly in front and therefore rises, partly in consequence of the increased angle of inclination of the planes and partly in consequence of the lifting force produced by the lifting propellers themselves. The two laterally-directed components of the lifting forces of the steering propellers negative one another, as already mentioned above. If it is wished to steer the flying machine to one side, on the contrary, the lever H must be moved a definite amount and the hand-wheel W simultaneously rotated such an amount and in such a direction that only the steering rope of that lifting propeller is pulled that will cause the machine to be deviated in the desired direction laterally from its rectilinear path of flight.

The rotation of the hand-wheel simultaneous with the rocking of the lever lengthens one of the ropes to an extent equal to the shortening of that rope due to the rocking of the lever; consequently the said rope is not pulled. In the case of the other rope, however, the rotation of the hand-wheel adds to the shortening effect of rocking the lever. The result is, that the blades of one propeller are adjusted at a greater pitch, whereas the blades of the other propeller remain unaffected. It will, however, be clear that the controlling apparatus also allows of effecting simultaneous adjustment of the blades of both propellers, uniformly or unequally, the resultant effect of the controlling movements depending on the relation borne by the rotation of the hand-wheel to the rocking of the lever.

Figs. 4 to 6 illustrate an improved form of the steering and steadying propeller according to Fig. 1. According to the latter figure the shafts $y$, $y_1$ of the steadying propellers are connected rigidly with the main frame of the flying machine or with the steadying propeller frame. This rigid connection has the disadvantage that the gyratory bodies are prevented from executing the so-called precession movement, i. e., the deviating movement with the result that the two gyratory bodies have no effect on the longitudinal stability of the machine; as they rotate in opposite directions, their individual tendencies to prevent pitching neutralize each other. In order to remedy this drawback I interpolate in the steadying propeller shaft a universal joint and connect its ends elastically with the steadying propeller frame in such manner that when the axles of the steadying propellers are deflected the propellers can swing out freely at right angles thereto in any direction.

The two steadying propellers are driven in the above described manner from the shaft of the main driving screw propeller by means of two pairs of bevel gears $b$, $c$, and $d$, $f$. But while, according to Fig. 1, the bottom ends of the shafts $y$, $y_1$ are only journaled once, as described in detail in my co-pending application Serial No. 536,686, in a ball-bearing comprising two rings of balls, by which the shafts are prevented from being shifted longitudinally both upwardly and downwardly, two bearings are provided according to Fig. 4, i. e., the double ball-bearing is divided into two single ball-bearings $l$, $l_1$, of which the one prevents the shaft being shifted longitudinally downwardly and the other upwardly. Directly above the top bearing $l_1$ are interpolated in the shafts universal joints G, $G_1$, of which one is represented in section in Fig. 6 on an enlarged scale. The steering rope $s$ is led through a hole in the center of the cross-piece of this joint.

The top ends of the steadying propeller shafts are journaled in ball-bearings R, $R_1$ connected with the frame by wire ties D, $D_1$. Springs F, $F_1$, whose tensions can be adjusted exactly by means of turn-buckles E, $E_1$, are interpolated in these wires. Obviously, these springs may be replaced by india-rubber stretchers of suitable strength.

Now if the flying machine is rotated, for example, about a transverse axis by a gust of wind which overcomes the resistance of the gyratory bodies, i. e., if the angle of inclination of the planes is increased or diminished, the steadying propellers, when executing the precession movement can swing out at right angles to the force disturbing the equilibrium, that is transversely, as is indicated by dotted lines in the drawing; this swinging movement takes place outwardly or inwardly according in each instance to the direction in which the flying machine is rotated around the transverse axis. Reversely, the gyratory bodies swing in the longitudinal direction, i. e., alternately forward or backward, according as the flying machine is swung in the one or the other direction around its longitudinal axis. The amount of the swing is determined by the tension of the springs or india-rubber interpolated in the ties, which, as mentioned above, can be adjusted by turn-buckles.

The general arrangement of the flying machine is shown in Figs. 7 to 10. In addition to the two principal planes H and $H_1$ arranged at the two sides of the steering and steadying propellers, a tail plane S is provided which carries approximately 10 to 30% of the entire weight (weight of the machine + useful load) which is to be lifted, while the main planes are loaded at full speed with about 70 to 90% of the total weight. Between the two main planes and the tail plane, i. e., at some distance behind the main planes and in the longitudinal main frame of the machine, are arranged the seats $a_1$, $B_2$, $a_3$, for six persons, including the pilot, the same being suspended like a pendulum by means of india-rubber bands from the tube $z$ attached to the frame of the steadying propellers. This seat-pendulum is connected by rods $m$, $m_1$ of thin steel tubing with the masts $u$ of the tail plane which is adjustable about its axis $o$. The purpose of this arrangement is to prevent the machine turning over backward in consequence of a violent gust of wind or too sudden adjustment of the lifting propellers to full pitch. Namely if, owing to one of these causes, the machine is suddenly lifted too much in front, in consequence of the head resistance, which is thereby very considerably increased, and of the great reduction of speed of the machine caused hereby, a considerable force of inertia becomes operative in the heavy pendulum body constituted by the suspended seat, with the pilot and passengers, in consequence of which the seat-pendulum will swing forward and by means of the rods $m$, $m_1$ adjust the tail plane to a greater inclination so that, in consequence of the increased lifting force, this plane has the tendency to elevate the machine at the rear and return it into its normal position. The seat-pendulum is prevented from swinging to the rear by the tube $h$ abutting against the supports $k$, and in order that the same cannot oscillate to and fro during the normal journey, it is held in this position by india-rubber stretchers $g$, whose tension can be suitably adjusted.

In order to be able exactly to adjust the angle of inclination of the tail plane S corresponding to the distribution of load which is carried by it and the main planes H $H_1$ and which varies somewhat with the number of occupants in the apparatus, I interpolate a turn-buckle $v$ having right-handed and left-handed screw threads, or an equivalent member, in each of the rods $m$ $m_1$, connecting the seat-pendulum with the masts $u$ of the tail plane. Further, if preferred, it may be arranged that the adjusting device can be actuated during flight by a suitable lever mechanism or by a rope from the pilot's seat.

Owing to the two steadying propellers K, $K_1$ and the above described arrangement stability is sufficiently guaranteed as long as the motor operates. If this breaks down the large main driving screw propeller Z is used as a wind motor for driving the steering and steadying propellers, the motor resistance being cut out in known manner by holding the exhaust valves open, or by throwing out a conveniently arranged clutch. The work requisite for this is supplied by the machine itself descending along an inclined plane, the potential energy of position stored in it being used for overcoming the head resistance.

The operations when the motor breaks down will take place somewhat as follows:— If, when the motor breaks down, the tractive power of the main driving screw propeller Z, which is applied somewhat below the main planes, falls to zero, at the first moment the machine will tend to climb upward in front under the resistance of the air which is still more increased by the surfaces of the propeller blades. Actual tilting up is however prevented on the one hand by the steadying action of the gyratory bodies and on the other hand because, in consequence of the great retardation of the velocity of travel, the seat-pendulum swings toward the front and places the tail plane S at a greater angle. Consequently, this acts automatically as an elevation rudder, i. e. it tends to elevate the machine at the rear and diminish the angle of the main planes. In the meantime the velocity of the machine has become less, and therefore the lifting force of the highly-loaded main planes is rapidly diminished, so that the machine is slowly moved downward in front under the double action of the tail plane acting as an automatic elevation rudder and the diminished lifting force of the main planes while overcoming the gyratory resistance. Consequently, the machine will descend again, and as the energy won hereby acts in increasing the horizontal velocity, it will soon reobtain its normal velocity of travel and, indeed, under certain circumstances, while continuously falling, obtain a materially greater velocity. Now in order to prevent the machine descending too rapidly, the pilot will more or less increase the pitch of the lifting propellers, that is, as it were, apply a brake. The work requisite for this is supplied, as already mentioned, by the main driving screw propeller acting as a wind motor it being presupposed that the pilot has cut out the motor resistance in good time. By correspondingly adjusting the lifting propellers the pilot is consequently able to regulate within certain limits the velocity of descent and the horizontal velocity of the machine dependent thereon, so that he can cause the machine to land safely without any additional auxiliary means. Immediately before landing, he will, of course, adjust the pitch of the lifting propellers to the maximum in order to make the landing more gentle.

Normally, i. e. when the motor is working, landing is brought about by adjusting the pitch of the lifting propellers to a maximum and simultaneously cutting out the main driving screw propeller Z. For this purpose the shaft of this propeller, driven by means of a chain by the motor $t$, is made in two parts $w$ and $w_1$ which are connected by a friction clutch $qu$. The end of the shaft $w_1$ is journaled in the hollow shaft $w$. Owing to the main driving propeller being uncoupled the entire output of the motor is at disposal for driving the two lifting propellers, so that these propellers can be adjusted to a very great pitch without overloading the motor, and accordingly they produce a very considerable lifting power, under the influence of which the machine is elevated in front in such manner that the angle of the planes is very greatly increased. In consequence of the greatly increased carrying power of these planes and also in consequence of the direct relieving of the same by the lifting power produced by the lifting propellers, the machine will come to rest very gently on the ground. This can be expected all the more because the seat-pendulum swings toward the front after the main driving propeller has been disconnected, in consequence of the great retardation of speed then occurring and sets the tail plane to a greater angle, so that not only the fore part but also the rear part of the machine will land gently under the increased carrying power of the tail plane. Similarly, starting is very considerably facilitated by the lifting propellers because, owing to the same being thrown into gear, the main planes are relieved, so that the machine will rise even at a relatively low starting velocity and a correspondingly short run, especially as the machine is so arranged that the angle of the planes is very considerably greater when starting than when traveling rapidly normally.

The shaft $w$, $w_1$ of the main driving propeller Z is preferably mounted so that it is located horizontally at full speed of the apparatus, when the angle of inclination of the carrying planes is reduced to a minimum by adjusting the pitch of the steering lifting propellers to about zero, as is described in the simultaneous co-pending application. In the starting position according to Fig. 7 it is then in a somewhat slanting position so that the tractive force of the propeller produces besides the horizontal pull a small vertical component tending to lift the apparatus. It is not unimportant that the tail plane S in this position of the main shaft is located exactly in the extension of the axis of the same (as is indicated in Fig. 7 by the dotted line), so that this plane is pulled directly i. e. in a straight line, by the main driving propeller which may be advantageous for stability.

The steering and steadying propellers are preferably arranged with somewhat rearwardly slanting shafts $y$, as is shown in Fig. 7. In this case the surfaces of the propeller blades act, even when their pitch is adjusted to zero, as rotating aeroplane planes, and consequently provide a not immaterial carrying force without any more motive power being employed for driving the steering and steadying propellers than is in any event unavoidable for overcoming the frictional resistance of the rotating planes against the air moving under them. The lifting force of the propellers produces in consequence of their slanting shafts a rearwardly-directed component tending to check the apparatus, but this is so small at high speed when the angle of inclination of the apparatus is reduced to a minimum, that it does not come into consideration as compared with the other resistances of travel. If, on the contrary, it is wished to reduce the speed of the apparatus, say for observing the surrounding country or for landing, this lateral component, which is very considerably increased corresponding to the greatly increased lifting force of the propellers and to the greatly increased angle of inclination of the apparatus, can only act advantageously. Particularly when landing, when the apparatus is handled in the manner above described, by disconnecting the main driving propeller Z by disengaging a clutch and employing the whole output of the motor for driving the lifting propellers adjusted to a very great pitch, the lateral component, which is very great under these circumstances, will brake strongly, so that the apparatus will not only contact gently with the ground in consequence of the action of the lifting propellers, but also rapidly come to rest.

I claim:—

1. In an aeroplane the combination, with sustaining planes adapted to carry the major part of the weight of the machine and a horizontally driving propeller, of two lifting screw propellers symmetrically disposed to the median vertical plane of the machine, with converging axes, said lifting propellers having adjustable blades.

2. In an aeroplane the combination, with sustaining planes adapted to carry the major part of the weight of the machine and a horizontally driving propeller, of two lifting screw propellers symmetrically disposed to the median vertical plane of the machine, with converging axes, said lifting propellers having adjustable blades, and means for collectively driving said lifting propellers and said horizontally driving propeller.

3. In an aeroplane the combination, with sustaining planes adapted to carry the major part of the weight of the machine and a horizontally driving propeller, of two lifting screw propellers symmetrically disposed to the median vertical plane of the machine, said lifting propellers having adjustable blades and axes converging toward the axis of said horizontally driving propeller.

4. In an aeroplane the combination, with sustaining planes adapted to carry the major part of the weight of the machine and a horizontally driving propeller, of two lifting screw propellers symmetrically disposed to the median vertical plane of the machine, said lifting propellers having adjustable blades and axes converging toward the axis of said horizontally driving propeller, and means for withdrawing the motor resistance in the case of the breaking down of the motor.

5. In an aeroplane the combination, with sustaining planes adapted to carry the major part of the weight of the machine and a horizontally driving propeller, of two lifting screw propellers symmetrically disposed to the median vertical plane of the machine, said lifting propellers having adjustable blades, a lever, a drum mounted upon said lever, a rope being guided by rollers mounted at a certain distance from the fulcrum of said lever, and means severally connecting the two ends of the rope to the blades of the two propellers, so that the blades of each propeller can be adjusted by pulling one rope end, said rope being wound on said drum so that by rocking the lever a pull can be executed on both ropes and that by rotating the hand-wheel the pull on the one rope can be more or less increased and the pull on the other rope more or less relaxed.

6. In an aeroplane the combination, with sustaining planes adapted to carry the major part of the weight of the machine and a horizontally driving propeller, of two lifting screw propellers symmetrically disposed to the median vertical plane of the machine, with converging axes, said lifting propellers having adjustable blades and heavy rims.

7. In an aeroplane the combination, with sustaining planes adapted to carry the major part of the weight of the machine and a horizontally driving propeller, of two lifting screw propellers symmetrically disposed to the median vertical plane of the machine, with converging axes, said lifting propellers having adjustable blades and heavy rims, shafts, universal joints in said propeller shafts, and elastically supported bearings for the upper ends of said propeller shafts enabling said shafts to swing radially in all directions in execution of precessional movements.

8. In an aeroplane the combination, with sustaining planes adapted to carry the major part of the weight of the machine and a horizontally driving propeller, of two lifting screw propellers symmetrically disposed to the median vertical plane of the machine, with converging axes, said lifting propellers having adjustable blades and heavy rims, shafts, universal joints in said propeller shafts, elastically supported bearings for the upper ends of said propeller shafts, and means for regulating the elasticity of the members by which said bearings are supported.

9. In an aeroplane the combination, with sustaining planes adapted to carry the major part of the weight of the machine and a horizontally driving propeller, of two lifting screw propellers symmetrically disposed to the median vertical plane of the machine, with converging axes, a sustaining tail plane normally slightly inclined to the horizontal and the disposition of the load to be carried by the machine between said sustaining tail plane and the main sustaining planes in such manner that the center of gravity of the machine is behind the axes of the lifting propellers.

10. In an aeroplane the combination, with sustaining planes adapted to carry the major part of the weight of the machine and a horizontally driving propeller, of two lifting screw propellers symmetrically disposed to the median vertical plane of the machine, with converging axes, a sustaining tail plane normally slightly inclined to the horizontal and adjustable about a transverse axis, a heavy member mounted so as to have fore and aft movement relatively to said tail plane under the influence of inertia, and means connecting said tail plane to said member, so that movement of the latter causes said plane to rotate about its axis.

11. In an aeroplane the combination, with sustaining planes adapted to carry the major part of the weight of the machine and a horizontally driving propeller, of two lifting screw propellers symmetrically disposed to the median vertical plane of the machine, with converging axes, a sustaining tail plane normally slightly inclined to the horizontal and adjustable about a transverse axis, a heavy member mounted so as to have fore and aft movement relatively to said tail plane under the influence of inertia, an abutment for said member, an elastic member tending to hold said heavy member against said abutment, and means connecting said tail plane to said heavy member, so that movement of the latter causes said plane to rotate about its axis.

12. In an aeroplane the combination, with sustaining planes adapted to carry the major part of the weight of the machine and a horizontally driving propeller, of two lifting screw propellers symmetrically disposed to the median vertical plane of the machine, with converging axes, a sustaining tail plane normally slightly inclined to the horizontal and adjustable about a transverse axis, a seat frame pivotally suspended so as to have fore and aft movement relatively to said tail plane under the influence of inertia, an abutment for said seat frame, an elastic member tending to hold said seat frame against said abutment, rods connecting the tail plane to said seat frame so that movement of the latter causes said plane to rotate about its axis.

13. In an aeroplane the combination, with sustaining planes adapted to carry the major part of the weight of the machine and a horizontally driving propeller, of two lifting screw propellers symmetrically disposed to the median vertical plane of the machine, with converging axes, a sustaining tail plane normally slightly inclined to the horizontal and adjustable about a transverse axis, a seat frame pivotally suspended so as to have fore and aft movement relatively to said tail plane under the influence of inertia, an abutment for said seat frame, an elastic member tending to hold said seat frame against said abutment, rods connecting said tail plane to said seat frame so that movement of the latter causes said plane to rotate about its axis, and turnbuckles interposed in said connecting rods by means of which the inclination of the tail plane relatively to the inclination of the main sustaining planes may be varied in accordance with the number of passengers or other useful load to be carried by the machine.

In testimony whereof, I affix my signature in the presence of two witnesses.

GUSTAV MEES.

Witnesses:
WOLDEMAR HAUPT,
HENRY HASPER.